United States Patent
Wu et al.

(10) Patent No.: US 7,869,924 B2
(45) Date of Patent: Jan. 11, 2011

(54) METHOD AND APPARATUS TO MONITOR A FLOW MANAGEMENT VALVE OF AN ELECTRO-MECHANICAL TRANSMISSION

(75) Inventors: Peter E. Wu, Brighton, MI (US); Ryan D Martini, Royal Oak, MI (US); Andrew M. Zettel, Ann Arbor, MI (US); Charles J Van Horn, Novi, MI (US); Thomas E Mathews, Pendleton, IN (US); Kambiz Panahi, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 749 days.

(21) Appl. No.: 11/870,042

(22) Filed: Oct. 10, 2007

(65) Prior Publication Data

US 2009/0099742 A1 Apr. 16, 2009

(51) Int. Cl.
*F16H 61/12* (2010.01)
(52) U.S. Cl. ............................ 701/51; 701/60; 475/117; 475/120; 475/128; 73/1.71; 477/107; 60/420

(58) Field of Classification Search .................. 701/51, 701/60, 55; 475/116, 207, 117, 120, 128; 903/915, 946; 477/107, 110, 5; 60/420; *F16H 61/12*
See application file for complete search history.

(56) References Cited

U.S. PATENT DOCUMENTS

| | | | | |
|---|---|---|---|---|
| 5,601,506 A | * | 2/1997 | Long et al. | 475/120 |
| 6,503,165 B1 | * | 1/2003 | Kubo et al. | 475/125 |
| 6,527,668 B2 | * | 3/2003 | Vorndran | 477/45 |
| 6,565,473 B2 | * | 5/2003 | Endo et al. | 475/117 |
| 6,567,735 B1 | * | 5/2003 | Bortfeld et al. | 701/52 |
| 6,829,528 B1 | * | 12/2004 | Kang et al. | 701/51 |
| 7,261,674 B2 | * | 8/2007 | Morise et al. | 477/117 |
| 2002/0098943 A1 | * | 7/2002 | Shultz et al. | 477/94 |
| 2008/0293541 A1 | * | 11/2008 | Kanafani et al. | 477/110 |

* cited by examiner

*Primary Examiner*—Tuan C To

(57) ABSTRACT

A flow management valve is operative to enable a multi-range electro-mechanical transmission in first and second ranges. Fluid pressure in a hydraulic circuit is monitored to detect a fault in the flow management valve.

17 Claims, 5 Drawing Sheets

METHOD AND APPARATUS TO MONITOR A FLOW MANAGEMENT VALVE OF AN ELECTRO-MECHANICAL TRANSMISSION

TECHNICAL FIELD

This invention relates to control systems for electro-mechanical transmissions.

BACKGROUND

The statements in this section merely provide background information related to the present disclosure and may not constitute prior art.

Powertrain architectures comprise torque-generative devices, including internal combustion engines and electric machines, which transmit torque through a transmission device to an output. One exemplary transmission includes a two-mode, compound-split, electro-mechanical transmission which utilizes an input member for receiving motive torque from a prime mover power source, for example an internal combustion engine, and an output member for delivering motive torque from the transmission to a vehicle driveline. Electric machines, operable as motors or generators, generate a torque input to the transmission, independently of a torque input from the internal combustion engine. The electric machines may transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electric machines.

The exemplary electro-mechanical transmission is selectively operative in a low range and a high range, which are descriptive of relative input/output speed ratios between the torque-generative devices and the output, i.e., the driveline. The low range and high range both preferably include continuously variable operation and fixed gear operation, the operation being controlled through selective application and release of torque-transfer clutches, via a hydraulic circuit. Fixed gear operation occurs when rotational speed of the transmission output member is a fixed ratio of rotational speed of the input member from the engine, due to application and release states of one or more torque transfer clutches. Continuously variable operation occurs when rotational speed of the transmission output member is variable based upon operating speeds of one or more of the electric machines.

The transmission is controlled in either the low range or the high range using a flow management valve, which transitions between a first position and second position in response to a command to shift operation to the low or high range. Anomalous operation in the hydraulic circuit or the flow management valve which results in the valve not transitioning can affect transmission operation, including a potential unintended application or release of one of the clutches.

SUMMARY

A multi-range electro-mechanical transmission includes a flow management valve having a first position enabling a first range and a second position enabling a second range. The flow management valve to transition from the first position to the second position and an output of a pressure monitoring device adapted to monitor the flow management valve is monitored. Proper operation of the flow management valve is determined when the output of the pressure monitoring device detects the transition within a predetermined period of time. A fault in the flow management valve is detected when no transition is detected in the output of the pressure monitoring device within the predetermined period of time.

BRIEF DESCRIPTION OF THE DRAWINGS

The disclosure may take physical form in certain parts and arrangement of parts, embodiments of which are described in detail and illustrated in the accompanying drawings which form a part hereof, and wherein.

DETAILED DESCRIPTION

Figure 1:
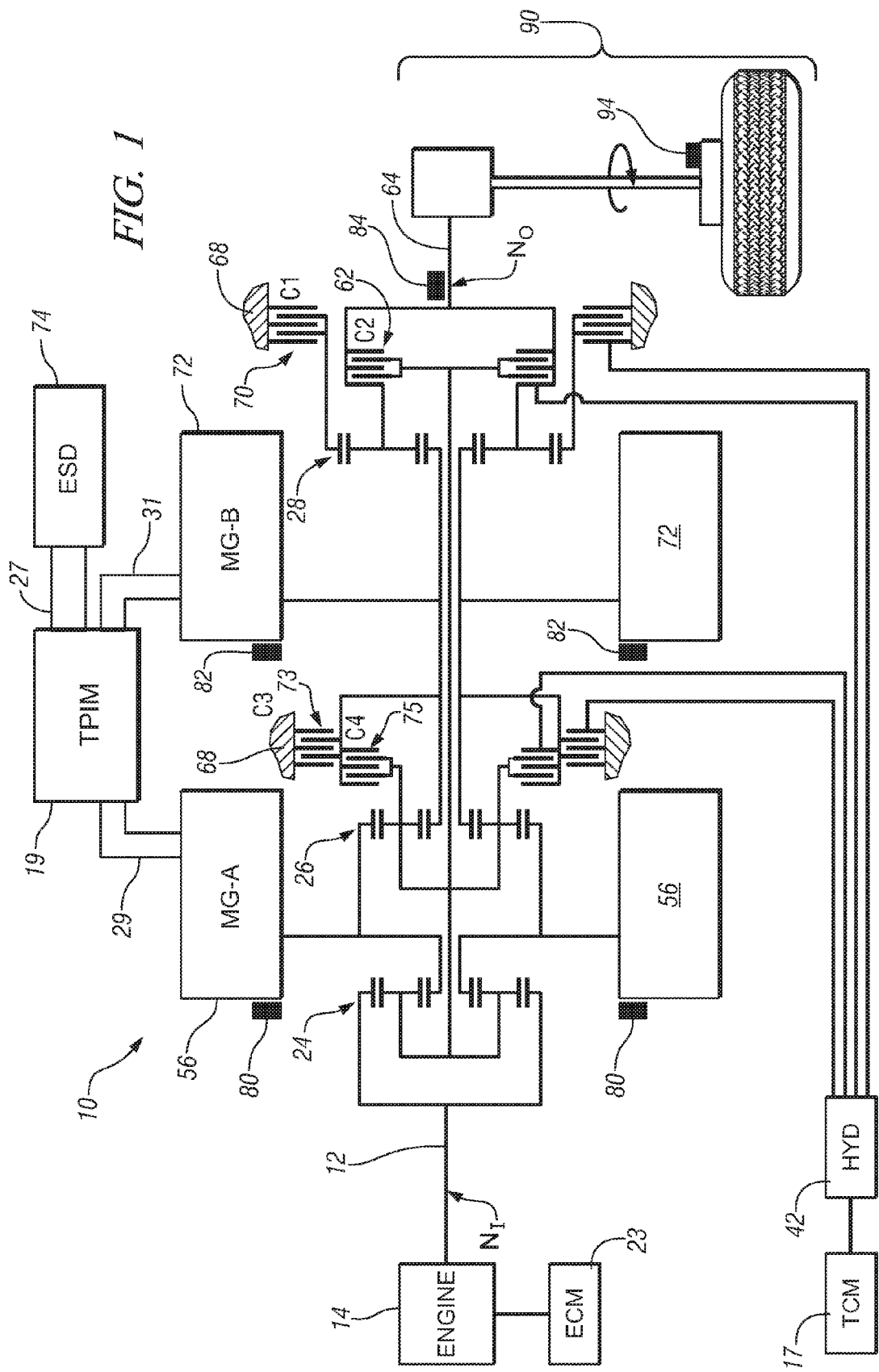
FIG. 1 is a schematic diagram of an exemplary powertrain, in accordance with the present disclosure.
Figure 2:
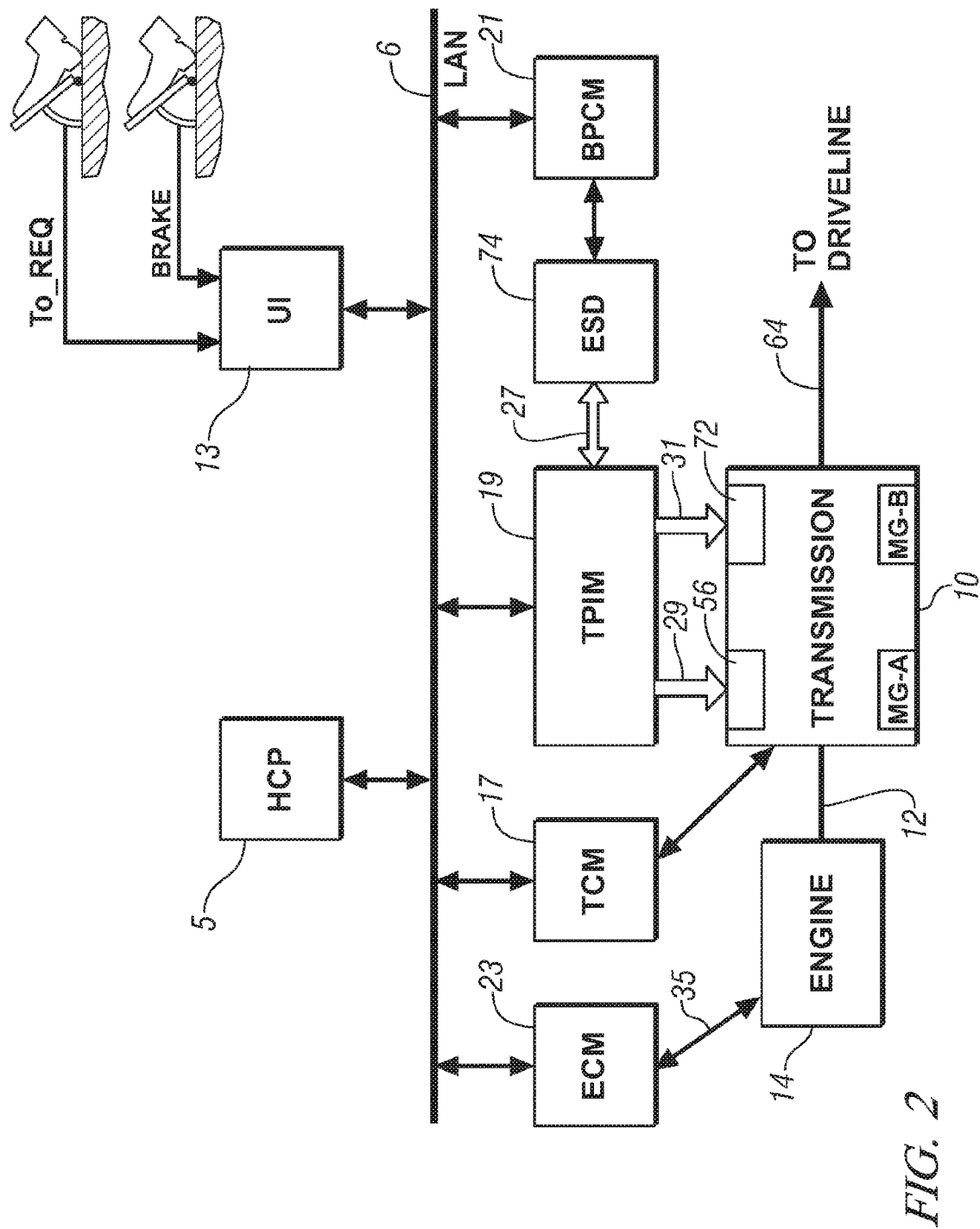
FIG. 2 is a schematic diagram of an exemplary architecture for a control system and powertrain, in accordance with the present disclosure.

Referring now to the drawings, wherein the depictions are for the purpose of illustrating certain exemplary embodiments only and not for the purpose of limiting the same, FIGS. 1 and 2 depict a system comprising an engine 14, transmission 10 including electric machines 56 and 72, a control system, and hydraulic control circuit 42. The exemplary hybrid powertrain system is configured to execute the control scheme depicted hereinbelow with reference to FIG. 5. Mechanical aspects of the exemplary transmission 10 are disclosed in detail in commonly assigned U.S. Pat. No. 6,953,409. The exemplary two-mode, compound-split, electro-mechanical hybrid transmission embodying the concepts of the present invention is depicted in FIG. 1. The transmission 10 includes an input shaft 12 having an input speed, $N_I$ that is preferably driven by the internal combustion engine 14, and an output shaft 64 having an output rotational speed, $N_O$.

The exemplary engine 14 comprises a multi-cylinder internal combustion engine selectively operative in several states to transmit torque to the transmission via shaft 12, and can be either a spark-ignition or a compression-ignition engine. The engine 14 has a crankshaft having characteristic speed $N_E$ which is operatively connected to the transmission input shaft 12. The output of the engine, comprising speed $N_E$ and output torque $T_E$ can differ from transmission input speed $N_I$ and input torque $T_I$ when a torque management device (not shown) is placed therebetween.

The transmission 10 comprises three planetary-gear sets 24, 26 and 28, and four torque-transmitting devices, i.e., clutches C1 70, C2 62, C3 73, and C4 75. An electro-hydraulic control system 42, preferably controlled by transmission control module ('TCM') 17, is operative to control clutch states. Clutches C2 62 and C4 75 preferably comprise hydraulically-actuated rotating friction clutches. Clutches C1 70 and C3 73 preferably comprise hydraulically-applied 56 stationary devices grounded to the transmission case 68. Each clutch is preferably hydraulically actuated, receiving pressurized hydraulic fluid from a pump via the electro-hydraulic control circuit 42.

The first and second electric machines 56, 72 preferably comprise three-phase AC motor/generator devices, referred to as MG-A 56 and MG-B 72, which are operatively connected to the transmission via the planetary gears. Each of the electric machines includes a stator, a rotor, and a resolver assembly 80, 82. The motor stator for each machine is grounded to outer transmission case 68, and includes a stator core with coiled electrical windings extending therefrom. The rotor for MG-A 56 is supported on a hub plate gear that is operably attached to an output shaft via carrier 26. The rotor for MG-B 72 is attached to a sleeve shaft hub. The motor resolver assemblies 80, 82 are appropriately positioned and assembled on MG-A 56 and MG-B 72. Each resolver assembly 80, 82 may be a well known variable reluctance device including a resolver stator, operably connected to the stator for each machine, and a resolver rotor, operably connected to the rotor for each machine described above. Each resolver 80, 82 comprises a sensing device adapted to sense rotational position of the resolver stator relative to the resolver rotor, and identify the rotational position. Signals output from the resolvers are interpreted to provide rotational speeds for MG-A 56 and MG-B 72, referred to as $N_A$ and $N_B$. Transmission output shaft 64 is operably connected to a vehicle driveline 90 to provide an output torque, $T_O$ vehicle wheels. There is a transmission output speed sensor 84 adapted to monitor rotational speed and rotational direction of the output shaft 64. Each of the vehicle wheels is preferably equipped with a sensor 94 adapted to monitor wheel speed, the output of which is monitored by one of the control modules of the control system to determine vehicle speed, and absolute and relative wheel speeds for braking control, traction control, and vehicle acceleration management.

The transmission 10 receives the engine input torque from the torque-generative devices, including the engine 14, MG-A 56 and MG-B 72, as a result of energy conversion from fuel or electrical potential stored in an electrical energy storage device ('ESD') 74. The ESD 74 is high voltage DC-coupled to a transmission power inverter module ('TPIM') 19 via DC transfer conductors 27.

The TPIM 19 includes power inverters and two motor control modules, and is an element of the control system described hereinafter with regard to FIG. 2. The first motor control module transmits electrical energy to and from MG-A 56 by transfer conductors 29, and the second motor control module similarly transmits electrical energy to and from MG-B 72 by transfer conductors 31. Electrical current is transmitted to and from the ESD 74 in accordance with whether the ESD 74 is being charged or discharged. The motor control modules receive motor control commands and control inverter states therefrom to provide motor drive or regeneration functionality. The inverters comprise known complementary three-phase power electronics devices. The inverters comprise controlled insulated gate bipolar transistors (IGBT) for converting DC power from the ESD 74 to AC power for powering one of the electrical machines MG-A 56, MG-B 72, by switching at high frequencies. There is typically one pair of IGBTs for each phase of the three-phase electric machines, MG-A 56 and MG-B 72.

Referring now to FIG. 2, a schematic block diagram of the exemplary control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A 56 and MG-B 72. The distributed control module architecture includes engine control module ('ECM') 23, transmission control module ('TCM') 17, battery pack control module ('BPCM') 21, and TPIM 19. A hybrid control module ('HCP') 5 provides supervisory control and coordination of the aforementioned control modules. There is a User Interface ('UI') 13 operably connected to a plurality of devices through which a vehicle operator typically controls or directs operation of the powertrain including the transmission 10. The devices include an operator torque request ('$T_{O\_REQ}$'), operator brake ('BRAKE'), a transmission gear selector, and a vehicle speed cruise control.

Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides supervisory control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: the operator torque request output to driveline 90, the engine input torque $T_I$, clutch torque ('$T_{CL\_N}$') for the N various torque-transfer clutches C1 70, C2 62, C3 73, C4 75 of the transmission 10; and motor torques $T_A$ and $T_B$ for MG-A 56 and MG-B 72. The TCM 17 is operatively connected to the electro-hydraulic control circuit 42, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine input torque command from the HCP 5, and generates a desired axle torque, and an indication of actual engine input torque, $T_I$, to the transmission, which is communicated to the HCP 5. Various other parameters that may be sensed by ECM 23 include engine coolant temperature and engine input speed, $N_E$, to shaft 12, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques ($T_{CL\_N}$) for each of the N clutches, i.e., C1 70, C2 62, C3 73, and C4 75, and rotational output speed, $N_O$, of the output shaft 64. Other actuators and sensors may be used to provide additional information from the TCM to the HCP for control purposes. The TCM 17 monitors inputs from hydraulic pressure switch devices PS1, PS2, PS3 and PS4 which are depicted with reference to FIG. 3. The TCM 17 selectively actuates and controls pressure control solenoids and flow management valves to apply and release various clutches to control the transmission to specific operating ranges and operating range states.

The BPCM 21 is signally connected one or more sensors operable to monitor electrical current or voltage parameters of the ESD 74 to provide information about the state of the batteries to the HCP 5. Such information includes battery state-of-charge, amp-hour throughput, battery voltage and available battery power.

Each of the aforementioned control modules is preferably a general-purpose digital computer generally comprising a microprocessor or central processing unit, storage mediums comprising read only memory ('ROM'), random access memory ('RAM'), electrically programmable read only memory ('EPROM'), high speed clock, analog to digital ('A/D') and digital to analog ('D/A') circuitry, and input/output circuitry and devices ('I/O') and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event.

Figure 3:
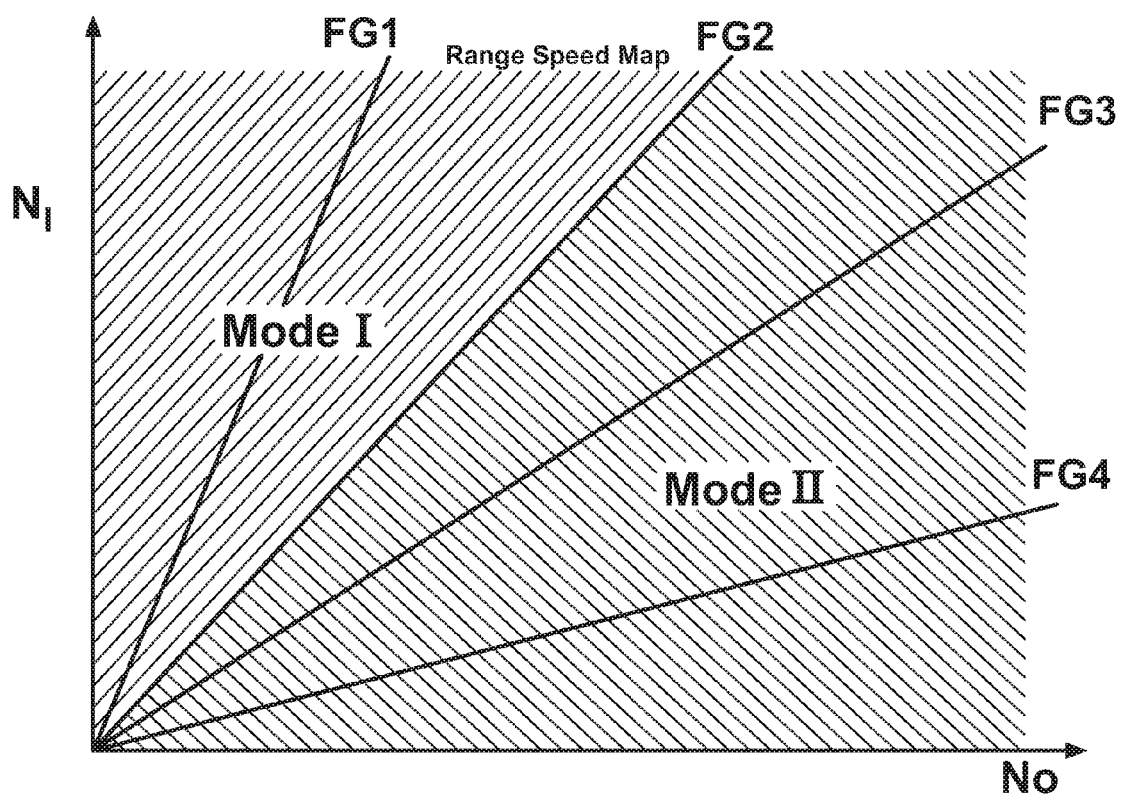
FIG. 3 is a graphical depiction, in accordance with the present disclosure.

Referring now to FIG. 3, the exemplary two-mode, compound-split, electro-mechanical transmission operates in one of several operating range states comprising fixed gear operation and continuously variable operation, described with reference to Table 1, below.

TABLE 1

| Transmission Operating Range State | Actuated Clutches | |
|---|---|---|
| Mode I - Engine Off (MI_Eng_Off) | C1 70 | |
| Mode I - Engine On (MI_Eng_On) | C1 70 | |
| Fixed Gear Ratio 1 (FG1) | C1 70 | C4 75 |
| Fixed Gear Ratio 2 (FG2) | C1 70 | C2 62 |
| Mode II - Engine Off (MII_Eng_Off) | C2 62 | |
| Mode II - Engine On (MII_Eng_On) | C2 62 | |
| Fixed Gear Ratio 3 (FG3) | C2 62 | C4 75 |
| Fixed Gear Ratio 4 (FG4) | C2 62 | C3 73 |

The various transmission operating range states described in the table indicate which of the specific clutches C1 70, C2 62, C3 73, C4 75 are applied for each of the operating range states. A first mode, i.e., Mode I, is selected when clutch C1 70 only is applied in order to "ground" the outer gear member of the third planetary gear set 28. The engine 14 can be either on or off. A second mode, i.e., Mode II, is selected when clutch C2 62 only is applied to connect the shaft 60 to the carrier of the third planetary gear set 28. Again, the engine 14 can be either on or off. For purposes of this description, Engine Off is defined by engine input speed, $N_E$, being equal to zero revolutions per minute ('RPM), i.e., the engine crankshaft is not rotating. Other factors outside the scope of the invention affect when the electric machines 56, 72 operate as motors and generators, and are not discussed herein.

Modes I and II refer to circumstances in which the transmission functions are controlled by one applied clutch, i.e., either clutch C1 62 or C2 70, and by the controlled speed and torque of the electric machines MG-A 56 and MG-B 72, which can be referred to as a continuously variable transmission mode. Certain ranges of operation are described below in which fixed gear ratios are achieved by applying an additional clutch. This additional clutch may be the unapplied one of clutch C1 70 or clutch C2 62 or clutch C3 73 or C4 75, as depicted in Table 1, above. When the additional clutch is applied, fixed ratio operation of input-to-output speed of the transmission, i.e., $N_I/N_O$, is achieved. The rotations of machines MG-A 56 and MG-B 72, i.e., $N_A$ and $N_B$, are dependent on internal rotation of the mechanism as defined by the clutching and proportional to the input speed measured at shaft 12.

In response to an operator's action, as captured by the UI 13, the HCP control 5 and one or more of the other control modules determine the operator torque request to be executed at shaft 64. Final vehicle acceleration is affected by other factors, including, e.g., road load, road grade, and vehicle mass. The operating mode is determined for the exemplary transmission based upon a variety of operating characteristics of the powertrain. This includes an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electric machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A 56 and MG-B 72. The control system manages torque inputs from the engine 14 and MG-A 56 and MG-B 72 based upon an outcome of the executed optimization routine, and system optimization occurs to optimize system efficiencies to improve fuel economy and manage battery charging. Furthermore, operation can be controlled based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

As should be apparent from the description above, the energy storage system and electric machines MG-A 56 and MG-B 72 are electrically-operatively coupled for power flow therebetween. Furthermore, the engine, the electric machines, and the electro-mechanical transmission are mechanically-operatively coupled to transmit power therebetween to generate a power flow to the output. In Mode I operation, the transmission operates as an input-split EVT. In Mode II operation, the transmission operates as a compound-split EVT. While operating in either of these two modes, the control system performs closed loop control on an engine speed which optimizes fuel economy while still meeting the torque request and given power constraints. It then commands motor speeds to vary the input-to-output speed ratio to accelerate the vehicle, in response to the operator torque request. Through use of the two additional clutches, the transmission also has the capability of achieving one of four fixed gear ratios. While operating in a fixed gear, the vehicle acts as a parallel hybrid and the motors are used only for boosting and braking/regeneration the vehicle.

Figure 4:
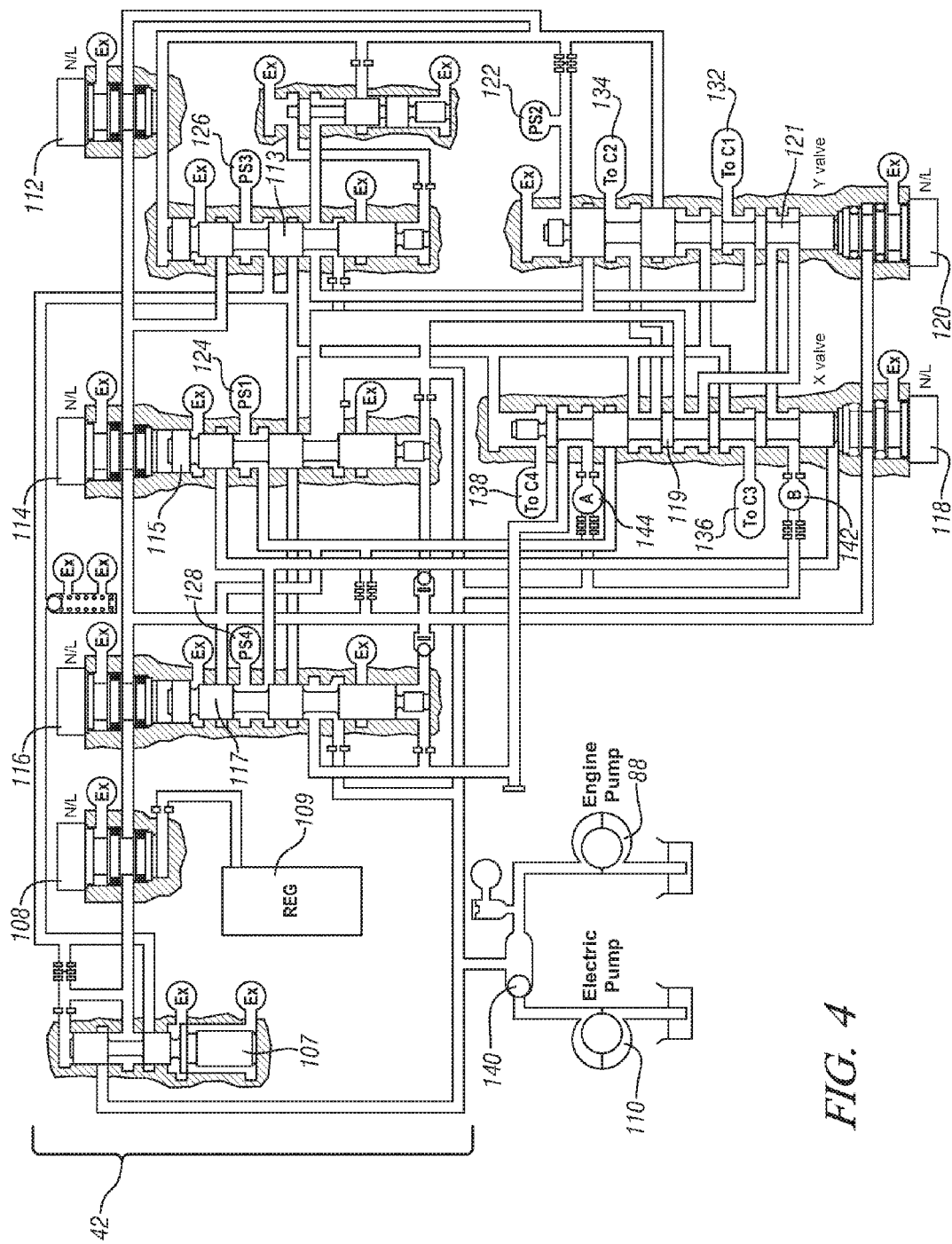
FIG. 4 is a schematic diagram of a hydraulic circuit, in accordance with the present disclosure.

Referring to FIG. 4, a schematic diagram providing a more detailed description of the exemplary electro-hydraulic system for controlling flow of hydraulic fluid in the exemplary transmission is shown. A main hydraulic pump 88, driven off the input shaft 12 from the engine 14, and an auxiliary pump 110, operatively electrically controlled by the TPIM 19, provide pressurized fluid to the hydraulic control circuit 42 through valve 140. The auxiliary pump 110 preferably comprises an electrically-powered pump of an appropriate size and capacity to provide sufficient flow of pressurized hydraulic fluid into the hydraulic system when operational. Pressurized hydraulic fluid flows into hydraulic control circuit 42, which is operable to selectively distribute hydraulic pressure to a series of devices, including the torque transfer clutches C1 70, C2 62, C3 73, and C4 75, active cooling circuits for MG-A 56 and MG-B 72, and a base cooling circuit for cooling and lubricating the transmission 10 via passages 142, 144, including flow restrictors 148, 146 (not depicted in detail). As previously stated, the TCM 17 controls the various clutches to achieve various transmission operating modes through selective control of pressure control solenoids ('PCS') PCS1 108, PCS2 112, PCS3 114, PCS4 116 and solenoid-controlled flow management valves X-valve 119 and Y-valve 121. The circuit is fluidly connected to pressure switches PS1, PS2, PS3, and PS4 via passages 124, 122, 126, and 128, respectively. There is an inlet spool valve 107. The pressure control solenoid PCS1 108 has a control position of normally high and is operative to modulate magnitude of fluidic pressure in the hydraulic circuit through fluidic interaction with controllable pressure regulator 109. Controllable pressure regulator 109, not shown in detail, interacts with PCS1 108 to control hydraulic pressure in the hydraulic circuit 42 over a range of pressures, depending upon operating conditions as described hereinafter. Pressure control solenoid PCS2 112 has a control position of normally low, and is fluidly connected to spool valve 113 and operative to effect flow therethrough when actuated. Spool valve 113 is fluidly connected to pressure switch PS3 via passage 126. Pressure control solenoid PCS3 114 has a control position of normally low, and is fluidly connected to spool valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve with which to control flow to different devices in the hydraulic circuit 42 and the transmission 10. The X-valve 119 is operative to direct pressurized fluid to clutches C3 73 and C4 75 and cooling systems for stators of MG-A 56 and MG-B 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS2 via passage 122.

An exemplary logic table to accomplish control of the exemplary electro-hydraulic control circuit 42 is provided with reference to Table 2, below.

TABLE 2

| Operating State | X-Valve Logic No Latch | Y-Valve Logic C2 Latch | PCS1 Normal High | PCS2 Normal High | PCS3 Normal High | PCS4 Normal Low |
| --- | --- | --- | --- | --- | --- | --- |
| Mode I (EVT Low) | 0 | 0 | Line Modulation | MG-B Stator Cool | C1 | MG-A Stator Cool |
| Mode II (EVT High) | 0 | 1 | Line Modulation | C2 | MG-B Stator Cool | MG-A Stator Cool |
| Low Range FG1, FG2 Mode I | 1 | 0 | Line Modulation | C2 | C1 | C4 |
| High Range FG3, FG4 Mode II | 1 | 1 | Line Modulation | C2 | C3 | C4 |

Selective control of the X-valve 119 and Y-valve 121 and actuation of the solenoids PCS2 112, PCS3 114, and PCS4 116 facilitate flow of hydraulic fluid to selectively apply clutches C1 70, C2 62, C3 73, C4 75 and provide cooling for the stators of MG-A 56 and MG-B 72.

The X-valve 119 controls operation in one of either the fixed gear or continuously variable operating range states, depending upon the operating position.

The Y-valve 121 controls operation of the transmission in one of the Low Range or the High Range, depending upon the operating position. Thus, in the Low Range, the Y-valve 121 is in the low position, or '0', and the transmission is selectively operative in Mode I, first gear (FG1) and second gear (FG2), depending upon the actuation of the clutch solenoids. In the High Range, the Y-valve 121 is in the high position, or '1', and the transmission is selectively operative in Mode II, third gear (FG3) and fourth gear (FG4), depending upon the actuation of the clutch solenoids. As depicted with reference to FIG. 3, operation of the transmission in the low range results in a relatively low output speed, $N_O$, in relation to input speed, $N_I$, and operation of the transmission in the high range results in a relatively high output speed, $N_O$, in relation to input speed, $N_I$. A transition in the position of the Y-valve 121 changes the transmission output between the Low Range and the High Range, the change depending upon the direction of the transition.

In operation, an operating mode, i.e., one of the fixed gear and continuously variable operating range states, is determined for the exemplary transmission based upon a variety of operating characteristics of the powertrain. This includes an operator torque request, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electric machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A 56 and MG-B 72. The control system manages torque inputs from the engine 14 and MG-A 56 and MG-B 72 based upon an outcome of the executed optimization routine, and system optimization occurs to optimize system efficiencies to improve fuel economy and manage battery charging. Furthermore, operation can be controlled based upon a fault in a component or system.

Referring now to the transmission described with reference to FIGS. 1 through 4, and Tables 1 and 2, specific aspects of the transmission and control system are described herein. The control system selectively actuates the pressure control devices and the flow management valves based upon a demand for torque, presence of a fault, and temperatures of the electric motors. The control system selectively commands one of the operating range states, in either the low range or the high range, by selective actuating the Y-valve 121 flow management valve to low ('0') state or to high ('1') state. Other operation can be commanded and controlled, including actuation of the stator cooling system for the electric machines and actuation of the clutches C1 70, C2 62, C3 73, and C4 75 based upon selective actuation of the pressure control devices.

As previously stated, fluid output from each of the second, third and fourth pressure control devices (i.e., PCS2 112, PCS3 114, and PCS4 116) is selectively mapped to one of the four hydraulically-actuated clutches and stator cooling systems for MG-A 56 and MG-B 72 based upon commanded positions of the first and second flow management valves. Therefore, selective actuation of PCS2 112 effects flow of hydraulic fluid to provide cooling to the stator of MG-B 72, when both the X-valve 119 and the Y-valve 121 are commanded to Low. Selective actuation of PCS2 112 effects flow of hydraulic fluid to actuate clutch C2 62 when either of the X-valve 119 and the Y-valve 121 are commanded to High. Selective actuation of PCS3 114 effects flow of hydraulic fluid to actuate clutch C1 70 when both the X-valve 119 and the Y-valve 121 are commanded to Low. Selective actuation of PCS3 114 effects flow of hydraulic fluid to provide cooling to the stator of MG-B 72 when the X-valve 119 is commanded to Low and the Y-valve 121 is commanded to High. Selective actuation of PCS3 114 effects flow of hydraulic fluid to actuate clutch C1 70 when the X-valve 119 is commanded to High and the Y-valve 121 is commanded to Low. Selective actuation of PCS3 114 effects flow of hydraulic fluid to actuate clutch C3 73 when both the X-valve 119 and the Y-valve 121 are commanded to High. Selective actuation of PCS4 116 effects flow of hydraulic fluid to provide cooling to the stator of MG-A 56 when the X-valve 119 is commanded to Low, regardless of the position to which the Y-valve 121 is commanded. Selective actuation of PCS4 116 effects flow of hydraulic fluid to actuate clutch C4 75 when the X-valve 119 is commanded to High, regardless of the position to which the Y-valve 121 is commanded.

Figure 5:
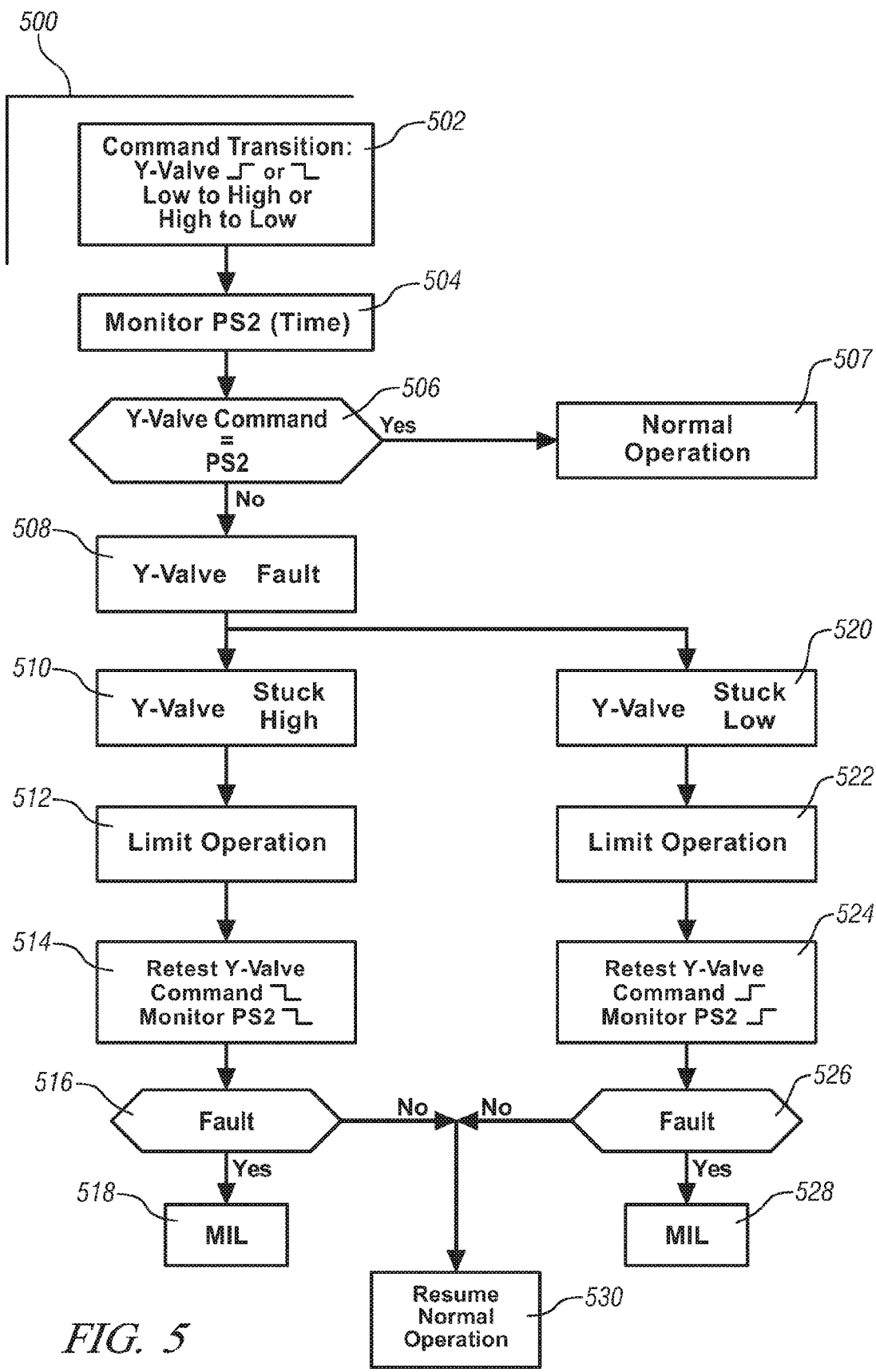
FIG. 5 is an algorithmic flowchart, in accordance with the present disclosure.

Referring now to the flowchart 500 depicted in FIG. 5, with reference to the exemplary transmission 10 described with reference to FIGS. 1 through 4, and Tables 1 and 2, controlling and monitoring operation of the Y-valve 121 is described. The Y-valve 121 flow management valve is operative to control the transmission in one of the low range and the high range. The operation includes commanding the flow management valve to transition from a first position to a second position, and monitoring an output of one of the pressure monitoring devices, specifically PS2. Proper operation of the Y-valve 121 is detected when the output of the monitored pressure monitoring device detects a corresponding transition in fluidic pressure within a predetermined period of time after the commanded transition. A fault is detected when no transition is detected in the output of the pressure monitoring device within the predetermined period of time subsequent thereto.

Monitoring the Y-valve 121 preferably comprises executing one or more algorithms in the control modules during ongoing operation. Operation of the transmission is monitored, including hydraulic pressures in the hydraulic circuit. During ongoing operation, the electro-mechanical transmission is commanded by one of the control modules to shift operation between the low range operation and the high range operation, through positional control of the Y-valve 121 (Step 502). Output of pressure switch PS2 is monitored (Step 504), to detect a change in the output within an elapsed period of time after the commanded change in position of the Y-valve 121. The period of time is dependent upon factors related to response times, including, e.g., ambient temperature, transmission operating time, and transmission fluid temperature. When there is a change in output of PS2 corresponding to the commanded change in position of the Y-valve 121 within the elapsed period of time, then it is presumed that the Y-valve 121 is functioning properly (Step 506), and the transmission is commanded to operate normally (Step 507). When the output of PS2 does not correspond to the commanded change in position of the Y-valve 121 within the elapsed period of time, then a fault in the Y-valve 121 is determined (Step 508). The Y-valve 121 fault is identified as either a Stuck-High fault (Step 510), or a Stuck-Low fault (Step 520), depending upon whether the commanded change in operation is from High to Low, or from Low to High, respectively.

When the Y-valve 121 fault is identified as the Stuck-High fault (Step 510), operation of the transmission is limited, including specifically inhibiting actuation of PCS2 112 to prevent inadvertent and unintended actuation of clutch C2 62, and specifically inhibiting actuation of PCS3 114 to prevent inadvertent and unintended actuation of clutch C1 70 and operation in a fixed gear, i.e., FG1, when operation in continuously variable mode is commanded, and prevent operation in FG2 (clutches C1 70 and C2 62 actuated) when FG4 operation (clutches C2 62 and C3 73 actuated) is commanded. Thus, cooling of the stator of MG-B 72 is inhibited in this operation (Step 512). A retest command is subsequently executed, wherein the valve is commanded to low position and output of PS2 is monitored, to determine whether the output of PS2 transitions to low position (Step 514). The retest command is preferably executed repetitively during ongoing operation to attempt to force the spool valve to become unstuck. A fault is identified when the output of PS2 does not transition to the low position. When a fault continues being detected for a predetermined quantity of iterations of the test during ongoing operation, or during retests occurring during successive operations of the vehicle (Step 516), a fault code is set in the control module, and the vehicle operator is notified by illuminating a malfunction indicator lamp ('MIL') (Step 518). When the outcome of a retest of the Y-valve 121 indicates that the fault is no longer occurring, i.e., the output of PS2 transitions to the low position when the Y-valve 121 is commanded low, the control module commands the system to resume normal operation (Step 530), which includes discontinuing the limited operation previously described.

When the Y-valve 121 fault is identified as the Stuck-Low fault (Step 520), operation of the transmission is limited, including specifically inhibiting actuation of PCS3 114 to prevent inadvertent actuation of clutch C1 70 and operation in low range when operation in the high range is intended. This includes specifically inhibiting actuation of PCS4 116 to prevent inadvertent or unintended actuation of clutch C4 75 and to prevent operation in one of the fixed gears, i.e., FG4, when continuously variable mode operation is commanded. Thus, cooling of the stator of MG-A 56 is inhibited in this operation (Step 522). A retest command is subsequently executed, wherein the valve is commanded to high position and output of PS2 is monitored, to determine whether the output of PS2 transitions to high position (Step 524). Again, the retest command is preferably executed repetitively during ongoing operation to attempt to force the spool valve to become unstuck. A fault is identified when the output of PS2 does not transition to the high position. When a fault continues being detected for a predetermined quantity of iterations of the test during ongoing operation, or during tests occurring during successive operations of the vehicle (Step 526), a fault code is set in the control module, and the vehicle operator is notified by illuminating the malfunction indicator lamp ('MIL') (Step 528). When the outcome of a subsequent one of the retests of the Y-valve 121 indicates that the fault is no longer occurring, i.e., the output of PS2 transitions to the high position when the Y-valve 121 is commanded high, the control module commands the system to resume normal operation (Step 530), which includes discontinuing the limited operation.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a flow management valve in a multi-range electro-mechanical transmission, the method comprising:
    providing a flow management valve having a first position enabling a first range and a second position enabling a second range;
    commanding the flow management valve to transition from the first position to the second position and monitoring an output of a pressure monitoring device adapted to monitor the flow management valve;
    determining proper operation of the flow management valve when the output of the pressure monitoring device detects the transition within a predetermined period of time; and,
    detecting a fault in the flow management valve when no transition is detected in the output of the pressure monitoring device within the predetermined period of time.

2. The method of claim 1, further comprising limiting operation of the transmission upon the detection of a fault in the flow management valve.

3. The method of claim 2, further comprising retesting the flow management valve by commanding the flow management valve to transition from the first position to the second position, and, monitoring the output of the pressure monitoring device.

4. The method of claim 3, further comprising resuming normal operation of the transmission when the pressure monitoring device detects the transition from the first position to the second position within the predetermined period of time subsequent thereto.

5. The method of claim 1, further comprising inhibiting actuation of specific pressure control solenoids of a hydraulic circuit of the electro-mechanical transmission upon detection of a fault in the flow management valve.

6. The method of claim 5, wherein inhibiting actuation of specific pressure control solenoids comprises inhibiting actuation of pressure control solenoids which effect electric motor cooling via the hydraulic circuit.

7. The method of claim 5, wherein inhibiting actuation of specific pressure control solenoids comprises inhibiting actuation of pressure control solenoids which effect clutch actuation via the hydraulic circuit.

8. The method of claim 1, wherein commanding the flow management valve to transition from the first position to the second position comprises commanding the transmission to shift between operation in the first range and in the second range.

9. The method of claim 8, further comprising commanding the transmission to shift between a first continuously variable operating range state and a second continuously variable operating range state.

10. The method of claim 8, wherein the first range comprises one of a fixed gear ratio and a continuously variable ratio.

11. The method of claim 8, wherein the second range comprises one of a fixed gear ratio and a continuously variable ratio.

12. Method for operating a flow management valve for a hydraulic circuit of an electro-mechanical transmission, the flow management valve operative to control the transmission in one of a low range and a high range, the method comprising:
    commanding the flow management valve to transition from a first position to a second position to effect a transition between the low range and the high range;
    monitoring an output of a pressure monitoring device fluidly coupled to the flow management valve;
    detecting a fault in the flow management valve when the output of the pressure monitoring device fails to detect a pressure transition within a predetermined period of time subsequent to the command to transition the flow management valve; and,
    retesting the flow management valve subsequent to the detection of a fault.

13. The method of claim 12, wherein retesting the flow management valve comprises:
    commanding the flow management valve to transition from the first position to the second position and monitoring the output of the pressure monitoring device; and,
    inhibiting normal operation of the transmission by preventing actuation of a pressure control solenoid operative to actuate a torque transfer clutch.

14. The method of claim 13, further comprising resuming the normal operation of the transmission when the monitored output of the pressure monitoring device indicates a transition from the first position to the second position.

15. Method to operate an electro-mechanical transmission, the transmission selectively operative in one of a low range and a high range through control of a flow management valve, the method comprising:
    adapting a pressure monitoring device to monitor the flow management valve;
    commanding the flow management valve to transition from a first position to a second position to effect a transition between the low range and the high range;
    monitoring output of the pressure monitoring device;
    detecting proper operation of the flow management valve when the output of the pressure monitoring device detects a pressure transition within a predetermined period of time; and, detecting a fault in the flow management valve when the output of the pressure monitoring device does not detect the pressure transition within the predetermined period of time.

16. The method of claim 15, further comprising limiting operation of the transmission upon the detection of a fault in the flow management valve.

17. The method of claim 16, wherein limiting operation of the transmission comprises inhibiting actuation of a pressure control solenoid operative to selectively actuate a torque-transfer clutch of the transmission.

* * * * *